(12) United States Patent
Huang et al.

(10) Patent No.: US 10,784,711 B2
(45) Date of Patent: Sep. 22, 2020

(54) PHOTOVOLTAIC ENERGY STORAGE AIR CONDITIONER AND CONTROL METHOD THEREOF

(71) Applicant: Gree Electric Appliances, Inc. of Zhuhai, Zhuhai (CN)

(72) Inventors: Meng Huang, Zhuhai (CN); Dongyuan Xu, Zhuhai (CN); Wenqiang Tang, Zhuhai (CN); Xia Liu, Zhuhai (CN); Shugong Nan, Zhuhai (CN); Peng Ren, Zhuhai (CN)

(73) Assignee: Gree Electric Appliances, Inc. of Zhuhai, Zhuhai, Guangdong (CN)

( * ) Notice: Subject to any disclaimer, the term of this patent is extended or adjusted under 35 U.S.C. 154(b) by 194 days.

(21) Appl. No.: 16/074,966

(22) PCT Filed: Jan. 23, 2017

(86) PCT No.: PCT/CN2017/072236
§ 371 (c)(1),
(2) Date: Aug. 2, 2018

(87) PCT Pub. No.: WO2017/133546
PCT Pub. Date: Aug. 10, 2017

(65) Prior Publication Data
US 2019/0052120 A1    Feb. 14, 2019

(30) Foreign Application Priority Data
Feb. 3, 2016  (CN) .......................... 2016 1 0076622

(51) Int. Cl.
*H02J 7/35* (2006.01)
*H02J 3/38* (2006.01)
(Continued)

(52) U.S. Cl.
CPC .............. *H02J 7/35* (2013.01); *F24F 5/0046* (2013.01); *H02J 3/14* (2013.01); *H02J 3/383* (2013.01);
(Continued)

(58) Field of Classification Search
None
See application file for complete search history.

(56) References Cited

U.S. PATENT DOCUMENTS

| 9,559,521 B1* | 1/2017 | King .......................... H02J 7/34 |
| 2009/0152947 A1* | 6/2009 | Wang ........................ H02J 1/14 307/24 |

(Continued)

FOREIGN PATENT DOCUMENTS

| CN | 102480167 A | 5/2012 |
| CN | 103208837 A | 7/2013 |

(Continued)

*Primary Examiner* — Jason Lin
(74) *Attorney, Agent, or Firm* — The Webb Law Firm

(57) ABSTRACT

The present disclosure relates to a photovoltaic energy storage air conditioner and a control method thereof. The air conditioner may include a photovoltaic power generation device, an energy storage device, an air conditioning unit and an energy scheduling and management device. The energy scheduling and management device may include: a detection module, configured to detect an operation state of the air conditioner, a power supply quantity and a working state of the photovoltaic power generation device and a power supply quantity and a working state of the energy storage device; and a scheduling module, configured to control power supply and/or charging according to the operation state of the air conditioner, the power supply quantity and the working state of the photovoltaic power generation device, the power supply quantity and the work- (Continued)

ing state of the energy storage device, preset power supply priorities and power usage priorities.

11 Claims, 8 Drawing Sheets

(51) Int. Cl.
*F24F 5/00* (2006.01)
*H02J 3/14* (2006.01)

(52) U.S. Cl.
CPC ... *F24F 2005/0067* (2013.01); *H02J 2310/14* (2020.01); *Y02E 10/566* (2013.01)

(56) References Cited

U.S. PATENT DOCUMENTS

| | | | | |
|---|---|---|---|---|
| 2011/0068624 A1* | 3/2011 | Dibachi | ............... | H02J 7/35 307/18 |
| 2011/0204720 A1* | 8/2011 | Ruiz | ............... | H02J 3/14 307/66 |
| 2012/0191253 A1* | 7/2012 | Rockenfeller | ............ | F24F 3/00 700/276 |
| 2012/0228950 A1 | 9/2012 | Sakai | | |
| 2012/0239214 A1* | 9/2012 | Nakashima | ............... | H02J 3/32 700/291 |
| 2013/0035802 A1* | 2/2013 | Khaitan | ............... | H02J 3/383 700/297 |
| 2013/0169046 A1* | 7/2013 | Shin | ............... | H02J 9/062 307/23 |
| 2013/0245852 A1* | 9/2013 | Sanders | ............... | G05B 15/02 700/295 |
| 2015/0032278 A1* | 1/2015 | Bhageria | ............... | H02J 4/00 700/295 |
| 2016/0099571 A1* | 4/2016 | Gelonese | ............... | H02J 3/386 307/23 |
| 2016/0118846 A1* | 4/2016 | Huang | ............... | H02J 7/35 320/101 |
| 2016/0141879 A1* | 5/2016 | Motsenbocker | ............... | H02J 7/35 307/18 |
| 2017/0070084 A1* | 3/2017 | Matsumoto | ............... | H02J 3/32 |

FOREIGN PATENT DOCUMENTS

| | | |
|---|---|---|
| CN | 203797842 U | 8/2014 |
| CN | 104092278 A | 10/2014 |
| CN | 104728968 A | 6/2015 |
| CN | 105071521 A | 11/2015 |
| CN | 105186549 A | 12/2015 |
| WO | 2011122681 A1 | 10/2011 |

* cited by examiner

PHOTOVOLTAIC ENERGY STORAGE AIR CONDITIONER AND CONTROL METHOD THEREOF

CROSS-REFERENCE TO RELATED APPLICATIONS

This application is the United States national phase of International Application No. PCT/CN2017/072236 filed. Jan. 23, 2017, and claims priority to Chinese Patent Application No. 201610076622.1 filed Feb. 3, 2016, the disclosures of which are hereby incorporated in their entirety by reference.

TECHNICAL FIELD

The present disclosure relates to the technical field of air conditioners, in particular to a photovoltaic energy storage air conditioner and a control method thereof.

BACKGROUND

Energy shortage is a relatively serious problem now. One of the solutions to this problem is the use of solar power. The existing mature photovoltaic air conditioning system mainly uses photovoltaic power and municipal power in combination. When the system is affected by some objective factors (such as darkness, power outage, weather changes, etc.), the photovoltaic air conditioning system may not operate normally. At present, some concepts of photovoltaic energy storage air conditioning systems have been proposed, in which an energy storage unit is added to the photovoltaic air conditioning system to form photovoltaic energy storage air conditioning system architecture so as to ensure energy supply and normal operations. However, the specific deployment method of energy in the photovoltaic air conditioning system and the operation state of the photovoltaic energy storage air conditioning system according to changes of energy supply are still unclear, and the coordinated operation and control strategy of the energy in the photovoltaic air conditioning system are also unclear, such that the energy supply in the photovoltaic air conditioning system is unstable, and dual-use of grid-connected and off-grid states cannot be achieved. Therefore, there is a need of a novel photovoltaic energy storage air conditioning system, which can operate stably and reliably under various energy changes and can achieve dual-use of grid-connected and off-grid states.

SUMMARY

In view of this, the present disclosure provides a photovoltaic energy storage air conditioner and a control method thereof.

According to one aspect of the present disclosure, there is provided a photovoltaic energy storage air conditioner, including: a photovoltaic power generation device, an energy storage device, an air conditioning unit and an energy scheduling and management device, wherein the photovoltaic power generation device, the energy storage device and a public power grid are connected to the air conditioning unit for power supply; the photovoltaic power generation device and the public power grid are connected to the energy storage device for charging; the photovoltaic power generation device is configured to comply a grid-connected power supply to the public power grid; and wherein the energy scheduling and management device includes: a detection module, configured to detect an operation state of the air conditioner, a power supply quantity and a working state of the photovoltaic power generation device and a power supply quantity and a working state of the energy storage device; and a scheduling module, configured to control power supply and/or charging according to the operation state of the air conditioner, the power supply quantity and the working state of the photovoltaic power generation device, the power supply quantity and the working state of the energy storage device, preset power supply priorities and power usage priorities.

In some embodiments, the photovoltaic power generation device includes a photovoltaic array, an inverter, a switching means, and an electric energy meter; the photovoltaic array, the switching means and the inverter are successively connected; the inverter is connected to the public power grid; the switching means is connected to the air conditioning unit; the electric energy meter is arranged on a line between the photovoltaic array and the switching means; and the detection module is connected to the electric energy meter to obtain an electric quantity generated by the photovoltaic array; and the scheduling module is connected to the switching means and the inverter so as to control the photovoltaic array to supply power to the air conditioning unit and/or the public power grid.

In some embodiments, the energy storage device includes an energy storage battery pack and a battery energy management module; and the battery energy management module is connected to the energy storage battery pack; the detection module and the scheduling module are connected to the battery energy management module, the detection module obtains an electric quantity of the energy storage battery pack through the battery energy management module, and the scheduling module controls a working state of the energy storage battery pack through the battery energy management module.

In some embodiments, the energy storage device further includes a direct current converter; and the energy storage battery pack is connected to the public power grid through the direct current converter.

In some embodiments, the air conditioning unit is adapted to connect to the public power grid through a switching device; and the scheduling module is connected to the switching device.

In some embodiments, the air conditioning unit includes a controller, and the controller is connected to the detection module to obtain the operation state of the air conditioner.

In some embodiments, the power supplies selected by the scheduling module according to the highest to lowest order of the power supply priorities are successively the photovoltaic power generation device, the energy storage device and the public power grid; and wherein the devices to be supplied power according to the highest to lowest order of the power supply priorities are successively the air conditioning unit, the energy storage device and the public power grid.

In some embodiments, the scheduling module is adapted to control the photovoltaic power generation device only to be a power supply for supplying power to the air conditioning unit, when determining that power generated by the photovoltaic power generation device is the same as power required for the operation of the air conditioning unit; the scheduling module is adapted to control the photovoltaic power generation device to charge the energy storage device, when determining that the air conditioning unit is not operating and power of the energy storage device is insufficient; and the scheduling module is adapted to control the photovoltaic power generation device to comply the grid-connected power supply to the public power grid, when determining that the air conditioning unit is not operating and the energy storage device has sufficient power or is not working.

In some embodiments, the scheduling module is adapted to control the energy storage device to drive the air conditioning unit to operate when determining that the photovoltaic power generation device is not generating power and power of the energy storage device is sufficient; the scheduling module is adapted to control the public power grid to charge the energy storage device when determining that the photovoltaic power generation device is not generating power and the air conditioning unit is not operating and power of the energy storage device is insufficient; the scheduling module is adapted to control the public power grid to drive the air conditioning unit to operate and control the public power grid to charge the energy storage device when determining that the photovoltaic power generation device is not generating power and power of the energy storage device is insufficient; and the scheduling module is adapted to control the photovoltaic power generation device to supply power to the air conditioning unit and control the photovoltaic power generation device to charge the energy storage device, when determining that power generated by the photovoltaic power generation device is more than power required for the operation of the air conditioning unit, and power of the energy storage device is insufficient.

In some embodiments, the scheduling module is adapted to control the photovoltaic power generation device to supply power to the air conditioning unit and control the photovoltaic power generation device to comply the grid-connected power supply to the public power grid, when determining that power generated by the photovoltaic power generation device is more than power required for the operation of the air conditioning unit, and the energy storage device has sufficient power or is not working; the scheduling module is adapted to control the photovoltaic power generation device and the public power grid to supply power to the air conditioning unit jointly and control the public power grid to charge the energy storage device, when determining that power generated by the photovoltaic power generation device is less than power required for the operation of the air conditioning unit, and power of the energy storage device is insufficient; and the scheduling module is adapted to control the photovoltaic power generation device and the energy storage device to supply power to the air conditioning unit jointly, when determining that power generated by the photovoltaic power generation device is less than power required for the operation of the air conditioning unit and power of the energy storage device is sufficient.

In some embodiments, the scheduling module is adapted to control the photovoltaic power generation device and the public power grid to supply power to the air conditioning unit jointly, when determining that power generated by the photovoltaic power generation device is less than power required for the operation of the air conditioning unit and the energy storage device is not working; and the scheduling module is adapted to control the public power grid to supply power to the air conditioning unit, when determining that the photovoltaic power generation device is not generating power and the energy storage device is not working.

According to one aspect of the present disclosure, there is provided a control method for a photovoltaic energy storage air conditioner, including: detecting an operation state of the air conditioner, a power supply quantity and a working state of the photovoltaic power generation device and a power supply quantity and a working state of the energy storage device; and controlling power supply and/or charging according to the operation state of the air conditioner, the power supply quantity and the working state of the photovoltaic power generation device, the power supply quantity and the working state of the energy storage device, preset power supply priorities and power usage priorities; wherein the photovoltaic power generation device, the energy storage device and a public power grid are connected to the air conditioning unit for power supply; the photovoltaic power generation device and the public power grid are connected to the energy storage device for charging; and the photovoltaic power generation device is further configured to comply a grid-connected power supply to the public power grid.

In some embodiments, controlling power supply and/or charging according to the operation state of the air conditioner, the power supply quantity and the working state of the photovoltaic power generation device, the power supply quantity and the working state of the energy storage device, preset power supply priorities and power usage priorities includes: successively selecting the photovoltaic power generation device, the energy storage device and the public power grid as the power supplies according to the highest to lowest order of the power supply priorities; wherein the devices to be supplied power according to the highest to lowest order of the power supply priorities are successively the air conditioning unit, the energy storage device and the public power grid.

In some embodiments, controlling power supply and/or charging according to the operation state of the air conditioner, the power supply quantity and the working state of the photovoltaic power generation device, the power supply quantity and the working state of the energy storage device, preset power supply priorities and power usage priorities includes: when determining that power generated by the photovoltaic power generation device is the same as power required for the operation of the air conditioning unit, selecting the photovoltaic power generation device only as a power supply for supplying power to the air conditioning unit; when determining that the air conditioning unit is not operating and power of the energy storage device is insufficient, selecting the photovoltaic power generation device to charge the energy storage device; and when determining that the air conditioning unit is not operating and the energy storage device has sufficient power or is not working, selecting the photovoltaic power generation device to comply the grid-connected power supply to the public power grid.

In some embodiments, controlling power supply and/or charging according to the operation state of the air conditioner, the power supply quantity and the working state of the photovoltaic power generation device, the power supply quantity and the working state of the energy storage device, preset power supply priorities and power usage priorities includes: when determining that the photovoltaic power generation device is not generating power and power of the energy storage device is sufficient, the energy storage device drives the air conditioning unit to operate;

when determining that the photovoltaic power generation device is not generating power, the air conditioning unit is not operating and power of the energy storage device is insufficient, the public power grid charges the energy storage device; and when determining that the photovoltaic power generation device is not generating power and power of the energy storage device is insufficient, the public power grid drives the air conditioning unit to operate, and the public power grid charges the energy storage device.

In some embodiments, controlling power supply and/or charging according to the operation state of the air conditioner, the power supply quantity and the working state of the photovoltaic power generation device, the power supply quantity and the working state of the energy storage device, preset power supply priorities and power usage priorities includes: when determining that power generated by the photovoltaic power generation device is more than power required for the operation of the air conditioning unit and power of the energy storage device is insufficient, the photovoltaic power generation device supplies power to the air conditioning unit, and the photovoltaic power generation device charges the energy storage device; when determining that power generated by the photovoltaic power generation device is more than power required for the operation of the air conditioning unit and the energy storage device has sufficient power or is not working, the photovoltaic power generation device supplies power to the air conditioning unit, and the photovoltaic power generation device complies the grid-connected power supply to the public power grid; and when determining that power generated by the photovoltaic power generation device is less than power required for the operation of the air conditioning unit and power of the energy storage device is insufficient, the photovoltaic power generation device and the public power grid supply power to the air conditioning unit jointly, and the public power grid charges the energy storage device.

In some embodiments, controlling power supply and/or charging according to the operation state of the air conditioner, the power supply quantity and the working state of the photovoltaic power generation device, the power supply quantity and the working state of the energy storage device, preset power supply priorities and power usage priorities includes: when determining that power generated by the photovoltaic power generation device is less than power required for the operation of the air conditioning unit and power of the energy storage device is sufficient, the photovoltaic power generation device and the energy storage device supply power to the air conditioning unit jointly; when determining that power generated by the photovoltaic power generation device is less than power required for the operation of the air conditioning unit and the energy storage device is not working, the photovoltaic power generation device and the public power grid supply power to the air conditioning unit jointly; and when determining that the photovoltaic power generation device is not generating power and the energy storage device is not working, the public power grid supplies power to the air conditioning unit.

According to the photovoltaic energy storage air conditioner and the control method of the present disclosure, the photovoltaic power generation device, the energy storage device and the municipal public power grid are connected to an air conditioner to form the photovoltaic energy storage air conditioner, which can operate in different working modes according to changes in actual electric quantity generated, power storage, and power usage, thereby implementing real-time operation in multiple working modes, reducing the impact of weather changes, the power storage quantity of a storage battery, and the operation state of a power grid on normal operations, and improving the stability and reliability. Moreover, no generated photovoltaic power is wasted, and the charging/discharging has less impact on the service life of the storage battery.

BRIEF DESCRIPTION OF THE DRAWINGS

In order to describe the technical solutions in the embodiments of the present disclosure or in the prior art more clearly, the accompanying drawings required for describing the embodiments or the prior art are introduced briefly below. Apparently, the accompanying drawings in the following description show only some embodiments of the present disclosure, and a person of ordinary skill in the art may still derive other drawings from these accompanying drawings without creative efforts.

DETAILED DESCRIPTION

The present disclosure will be illustrated more comprehensively below with reference to the accompanying drawings, in which exemplary embodiments of the present disclosure are described. A clear and complete description will be made to the technical solutions in the embodiments of the present disclosure below in combination with the accompanying drawings in the embodiments of the present disclosure. Apparently, the embodiments described are only part of the embodiments of the present disclosure, not all of them. All other embodiments obtained by a person of ordinary skill in the art based on the embodiments of the present disclosure without creative efforts shall fall within the protection scope of the present disclosure. The technical solutions of the present disclosure will be described in various aspects below in combination with the drawings and embodiments.

Figure 1:
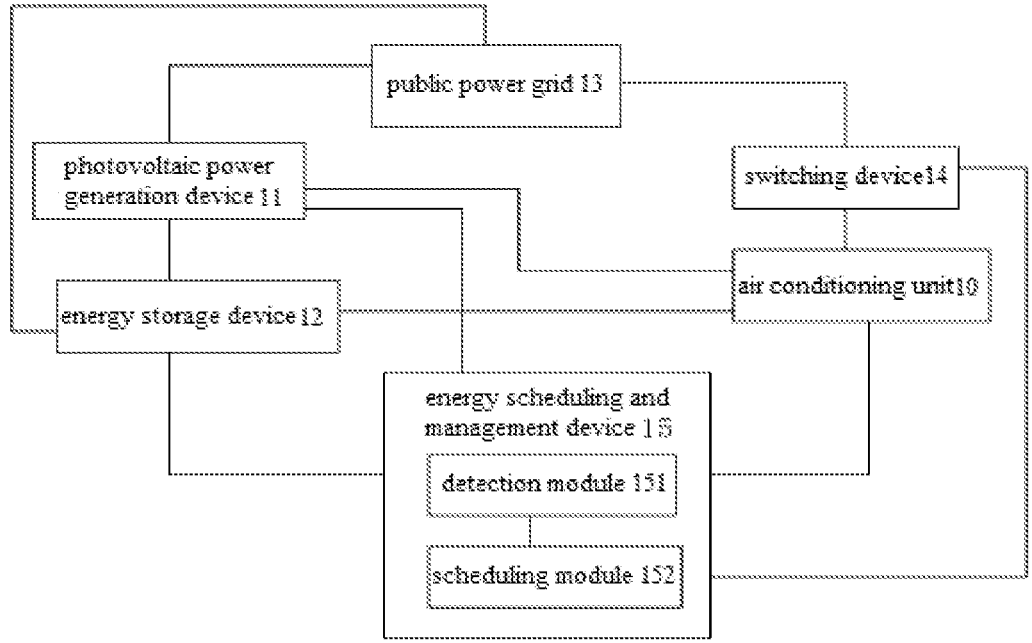
FIG. 1 is a schematic diagram showing control and power supply line connection according to some embodiments of a photovoltaic energy storage air conditioner of the present disclosure.

As shown in FIG. 1, the present disclosure provides a photovoltaic energy storage air conditioner, including: a photovoltaic power generation device 11, an energy storage device 12, an air conditioning unit 10, and an energy scheduling and management device 15. The photovoltaic power generation device 11, the energy storage device 12 and the public power grid 13 are connected to the air conditioning unit 10 for power supply. The photovoltaic power generation device 11 and the public power grid 13 are connected to the energy storage device 12 for charging. The photovoltaic power generation unit 12 is configured to comply a grid-connected power supply to the public power grid 13.

The energy scheduling and management device 15 includes a detection module 151 and a scheduling module 152. The detection module 151 detects an operation state of the air conditioner, a power supply quantity and a working state of the photovoltaic power generation device and a power supply quantity and a working state of the energy storage device. The scheduling module 152 controls power supply or charging, or power supply and charging simultaneously according to the operation state of the air conditioner, the power supply quantity and the working state of the photovoltaic power generation device, the power supply quantity and the working state of the energy storage device, preset power supply priorities and power usage priorities.

The photovoltaic power generation device 11, the energy storage device 12 and the public power grid 13 serve as three power supplies for the air conditioning unit 10. According to the operation state of the air conditioner, the power supply quantity and working state of each power supply, as well as power supply priorities and power usage priorities, the scheduling module 152 determines one or more of the three power supplies as actual power supplies that supply power to the air conditioning unit 10, determines one or both of the photovoltaic power generation device 11 and the public power grid 13 to charge the energy storage device 12, and determines the time of power supply and charging. The public power grid 13 of the present disclosure may be a municipal power grid or the like.

Multi-energy configuration flow may be performed in real time among the photovoltaic power generation device 11, the energy storage device 12, the air conditioning unit 10 and the municipal power grid to determine the power supply priorities, wherein photovoltaic power is preferentially used, followed by stored energy, and finally municipal power. The power usage priorities are determined is such a manner that air conditioning is preferentially met when the air conditioner is operating, followed by energy storage, and finally municipal power generation.

In the presence of two power supply forms including photovoltaic power generation and energy storage, the photovoltaic energy storage air conditioner in the above embodiments can realize off-grid operation under the condition of municipal power failure. The energy storage device 12 can be automatically and continuously charged using surplus energy in the operation process. Power generation of the photovoltaic power generation device 11, charging and discharging of the energy storage device 12 and power usage of the air conditioner can be tracked in real time. The dynamic switching time of the power supply energy can be less than 10 ms.

Figure 2:
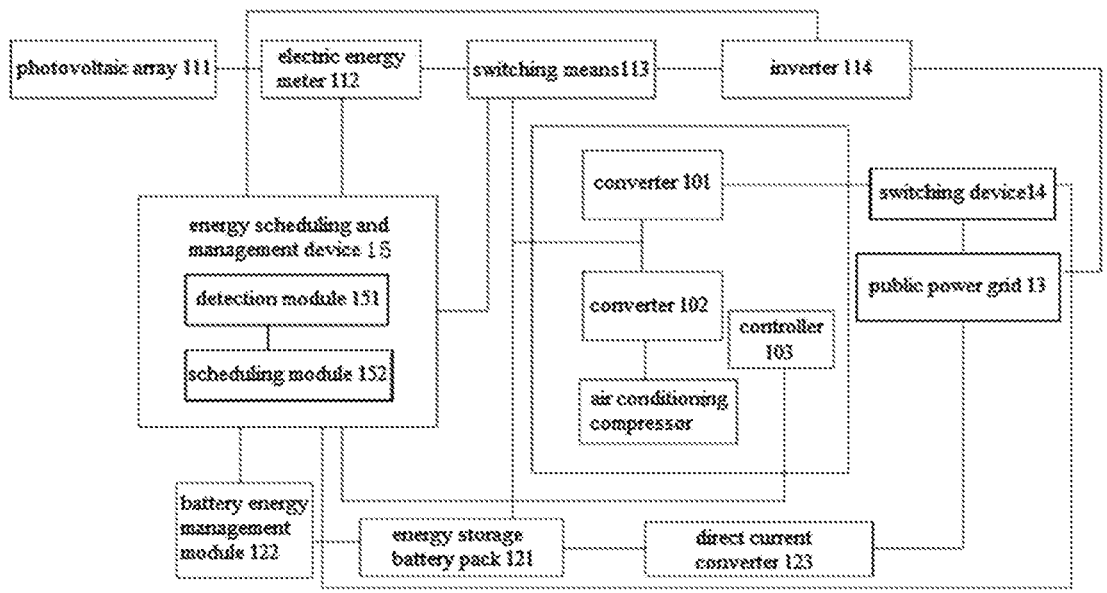
FIG. 2 is a schematic diagram showing control and power supply line connection according to some other embodiments of the photovoltaic energy storage air conditioner of the present disclosure.

There may be various types of photovoltaic power generation devices. For example, as shown in FIG. 2, the photovoltaic power generation device includes: a photovoltaic array 111, an inverter 114, a switching means 113, and an electric energy meter 112. The photovoltaic array 111, the switching means 113 and the inverter 114 are successively connected, the inverter 114 is connected to the public power grid 13, and the switching means 113 is connected to the air conditioning unit 10. The electric energy meter 112 is arranged on a line between the photovoltaic array 111 and the switching means 113.

The detection module 151 is connected to the electric energy meter 112 to obtain an electric quantity by the photovoltaic array 111. The scheduling module 152 is connected to the switching means 113 and the inverter 114 so as to control the photovoltaic array 111 to supply power to the air conditioning unit 10 or the public power grid 13, and can also supply power to the air conditioning unit 10 and the public power grid 13 at the same time. In some embodiments, the switching means 113 may not be provided, the power of the photovoltaic array 111 is transmitted to the air conditioning unit through the inverter 114, and the power of the photovoltaic array 111 is transmitted to the public power grid 13 by a internal circuit of the air conditioning unit, such that a grid-connected power supply is realized.

The power of the photovoltaic array 111 can be connected to the public power grid 13 through the inverter 114, and the inverter 114 can convert the direct current output by the photovoltaic array 111 to 220 or 380 volts of alternating current. The power generated by the photovoltaic array 111 is detected by the electric energy meter 112 or a metering module. The air conditioner as a power demand side produces a power demand according to the load, and preferentially uses photovoltaic power through a DC/AC module and an energy scheduling and management system.

The direct current output by the photovoltaic array 111 can be connected to a direct current bus between a converter 101 and a converter 102, or converted into alternating current by the inverter 114, and the alternating current is connected to the converter 101 or the converter 102. Photovoltaic power is one of power supplies. If the photovoltaic power can meet the power demand of the air conditioner, the air conditioner is supplied the photovoltaic power completely. If the photovoltaic power cannot meet the power demand of the air conditioner, power is scheduled from other energy sources and then supplied to the air conditioner.

The energy storage device includes: an energy storage battery pack 121 and a battery energy management module 122, wherein the energy storage battery pack 121 and the battery energy management module 122 are connected to each other. The detection module 151 and the scheduling module 152 are connected to the battery energy management module 122. The detection module 121 acquires electric quantity of the energy storage battery pack 121 and other information through the battery energy management module. The scheduling module 152 controls the working state of the energy storage battery pack 121 through the battery energy management module 122, such as charging, discharging, stopping operation, etc. The energy storage device detects electric quantity through the battery energy management module 122, and the battery energy management module 122 controls the charging/discharging operation and depth of the charge/discharge.

The operation states of the photovoltaic power generation device and the energy storage device are detectable by the energy scheduling and management device 15. The photovoltaic power generation device is a one-way power supply. As long as the light condition meets the power generation requirement, the photovoltaic power generation device generates power to the outside. When the photovoltaic condition does not meet the power generation requirement, the power generation is stopped. Thus, the operation state of the photovoltaic power generation device is excited by the light condition. The energy storage device is controlled by the battery energy management module to work or not, and the working state of the energy storage device is divided into charging and discharging.

The energy storage device may further include a direct current converter 123, and the energy storage battery pack 121 is connected to the public power grid 13 through the direct current converter 123. For example, the energy storage battery pack 121 may be a lithium battery pack. When direct current supply is needed, the photovoltaic array 111 generates direct current to directly charge the energy storage battery pack 121, and the energy storage battery pack 121 may also be supplied power through the direct current converter, a rectifying device, etc. The public power grid 13 generates low-voltage direct current through the direct current converter 123 to supply power to the energy storage battery pack 121.

The air conditioning unit 10 is adapted to connect to the public power grid 13 via the switching device 14, and the scheduling module 152 is connected to the switching device 14. The scheduling module 152 can control the public power grid 13 to supply power to the air conditioning unit by controlling on and off operation of the switching device 14. Switching devices may be provided on power supply lines between a plurality of power supplies and the air conditioning unit to control the plurality of power supplies to supply power to the air conditioning unit.

The air conditioning unit includes a controller 103. The controller 103 acquires an operation state of the air conditioner. The controller 103 of the air conditioning unit itself can detect the operation state of the air conditioning unit, including a full set of states such as an electrical parameter and a cooling load parameter. The energy scheduling and management module 15 also detects an operation state of the air conditioner in real time, mainly a power demand state.

According to the photovoltaic energy storage air conditioner in the above embodiments, the photovoltaic power generation device, the energy storage device and the municipal public power grid are connected to an air conditioner to form the photovoltaic energy storage air conditioner, wherein power supply priorities are determined by formulating a multi-energy linkage operation strategy, that is, photovoltaic power is referentially used, followed by stored energy, and finally municipal power; and power usage priorities are determined in such a manner that power usage of air conditioning is preferentially met when the air conditioner is operating, followed by energy storage, and finally municipal power generation.

The photovoltaic energy storage air conditioner in the above embodiments is adjusted to work in different modes under different conditions of photovoltaic power generation, energy storage and air conditioner power usage, thereby realizing adaptive multi-mode operation of the photovoltaic energy storage air conditioner. The operation state of the air conditioner can be maintained even under insufficient power of the photovoltaic array and extreme emergency of power grid failure, even the off-grid operation of the photovoltaic energy storage air conditioner can be realized, and the operation benefit of the system is maximized.

The power supplies selected by the scheduling module 152 according to the highest to lowest order of power supply priorities are successively the photovoltaic power generation device 11, the energy storage device 12 and the public power grid 13. The devices to be supplied power according to the highest to lowest order of the power supply priorities are successively the air conditioning unit 10, the energy storage device 12 and the public power grid 13.

In some embodiments, on the basis of the actual situations of photovoltaic power generation, energy storage and air conditioner power usage, the scheduling module 152 can switch the most suitable working mode in the current energy state according to the power supply priorities. There are totally 12 working modes, as shown in FIG. 3 to FIG. 14, thereby ensuring the most efficient usage of energy and the stable and reliable operation of the photovoltaic energy storage air conditioner.

Figure 3:
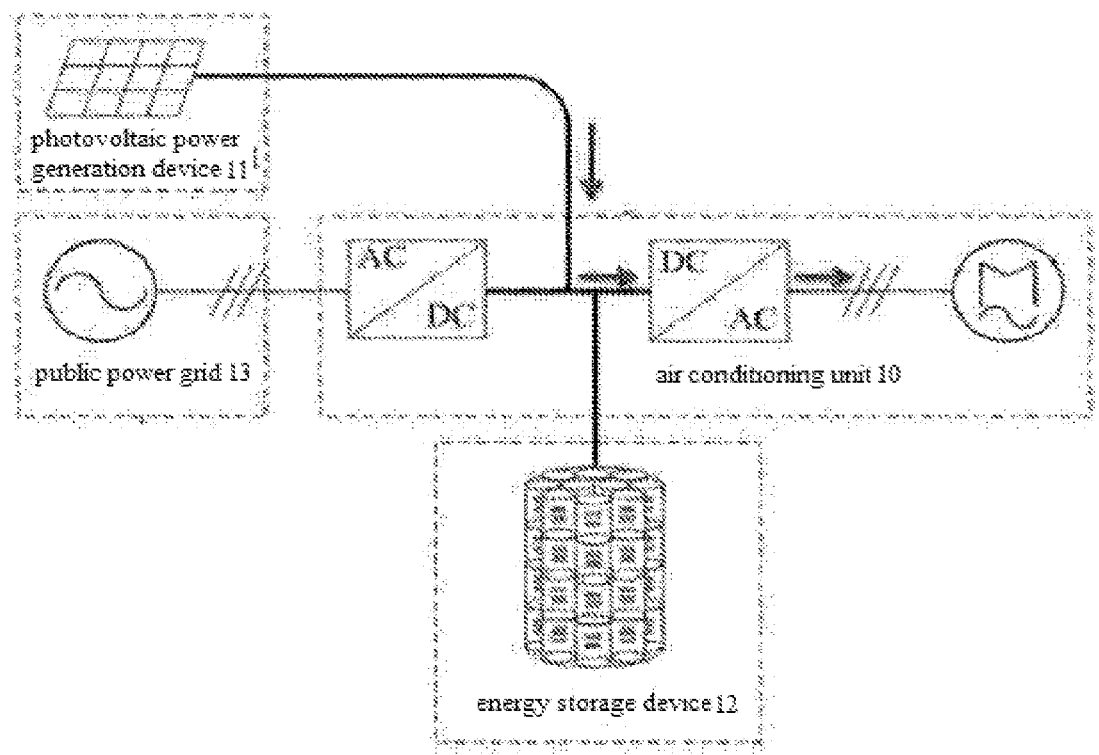
FIG. 3 is a schematic diagram of power supply in which power generated by a photovoltaic power generation device just meets the operation of the air conditioning unit, and the air conditioning unit is directly driven to operate by power generated by the photovoltaic power generation device.

When determining that power generated by the photovoltaic power generation device 11 is the same as power required for the operation of the air conditioning unit 10, the scheduling module 152 selects the photovoltaic power generation device 11 only as a power supply for supplying power to the air conditioning unit 10. This is the first working mode. As shown in FIG. 3, when power generated by the photovoltaic power generation device 11 just satisfies operation of multi-split air conditioners, the photovoltaic power generation device 11 generates power and directly supplies power to the air conditioning unit 10.

Figure 4:
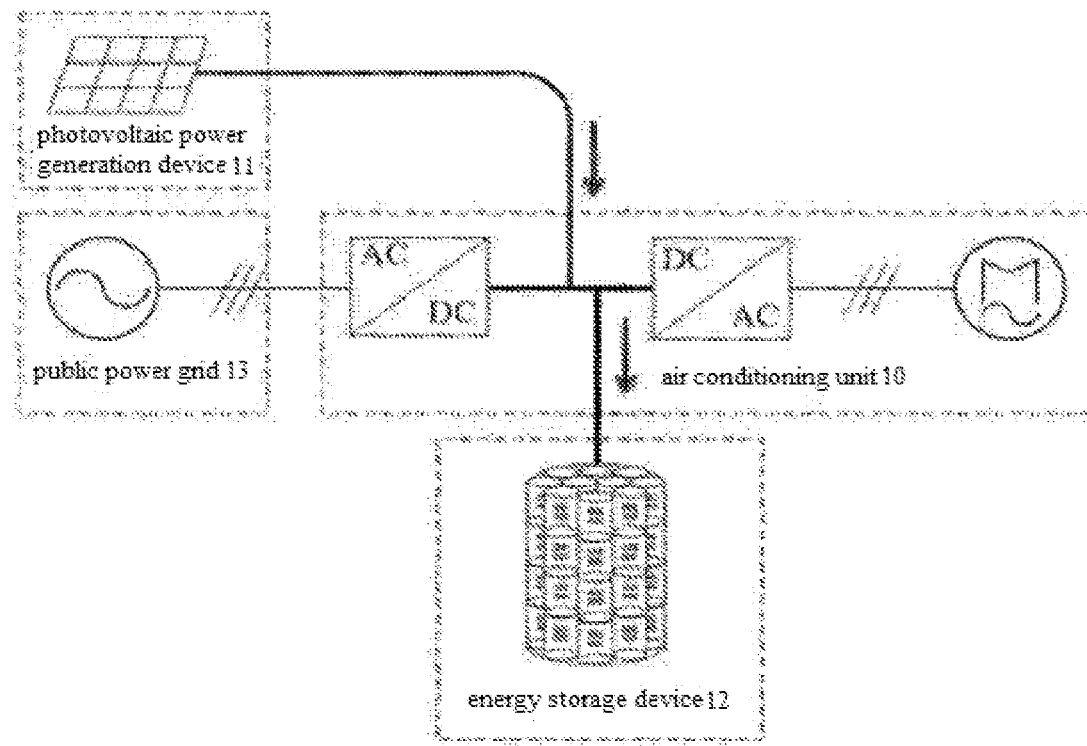
FIG. 4 is a schematic diagram of power supply in which the photovoltaic power generation device charges the energy storage device when the air conditioning unit is not operating, and power of the energy storage device is insufficient.

When determining that the air conditioning unit 10 is not operating and power of the energy storage device 12 is insufficient, the scheduling module 152 controls the photovoltaic power generation device 11 to charge the energy storage device 12. This is the second working mode. As shown in FIG. 4, when the air conditioning unit 10 is not operating, and power of the energy storage device 12 is insufficient, the photovoltaic power generation device 11 charges the energy storage device.

Figure 5:
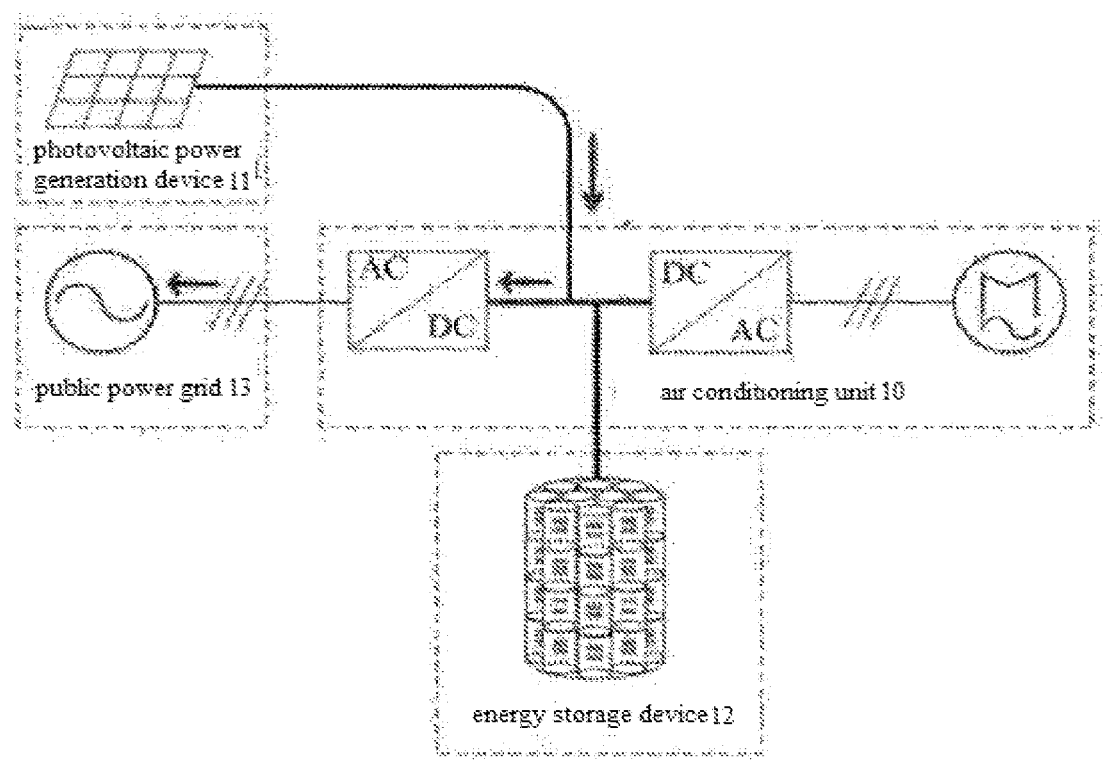
FIG. 5 is a schematic diagram of power supply in which all power generated by the photovoltaic power generation device is connected to a grid when the air conditioning unit is not operating, and the energy storage device has sufficient power or is not working.

When determining that the air conditioning unit 10 is not operating and the energy storage device 12 has sufficient power or is not working, the scheduling module 152 controls the photovoltaic power generation device 11 to comply the grid-connected power supply to the public power grid 13. This is the third working mode. As shown in FIG. 5, when the air conditioning unit 10 is not operating, and the energy storage device 12 has sufficient power or is not working, all power generated by the photovoltaic power generation device 11 is connected to the grid.

Figure 6:
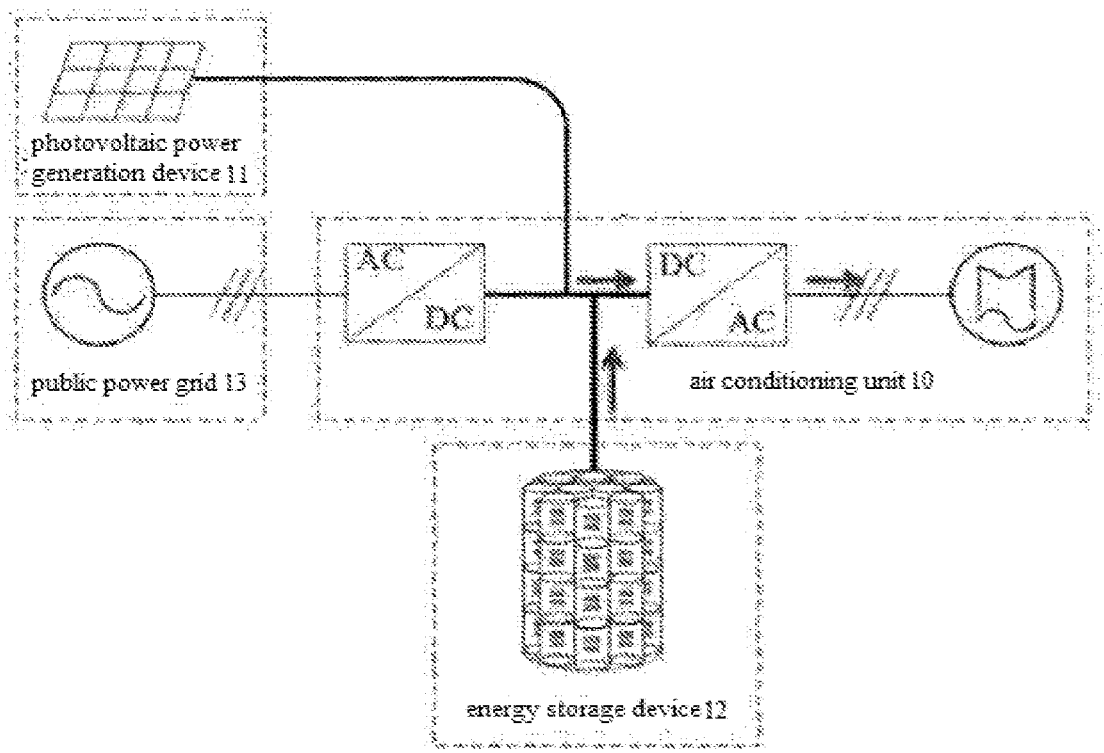
FIG. 6 is a schematic diagram of power supply in which the energy storage device supplies power to the air conditioning unit when the photovoltaic power generation device is not generating power, and power of the energy storage device is sufficient.

When determining that the photovoltaic power generation device 11 is not generating power and power of the energy storage device 12 is sufficient, the scheduling module 152 controls the energy storage device 12 to drive the air conditioning unit 10 to operate. This is the fourth working mode. As shown in FIG. 6, when the photovoltaic power generation device 11 is not generating power, and power of the energy storage device 12 is sufficient, the energy storage device 12 supplies power to the air conditioning unit 10 so as to drive the unit to operate.

Figure 7:
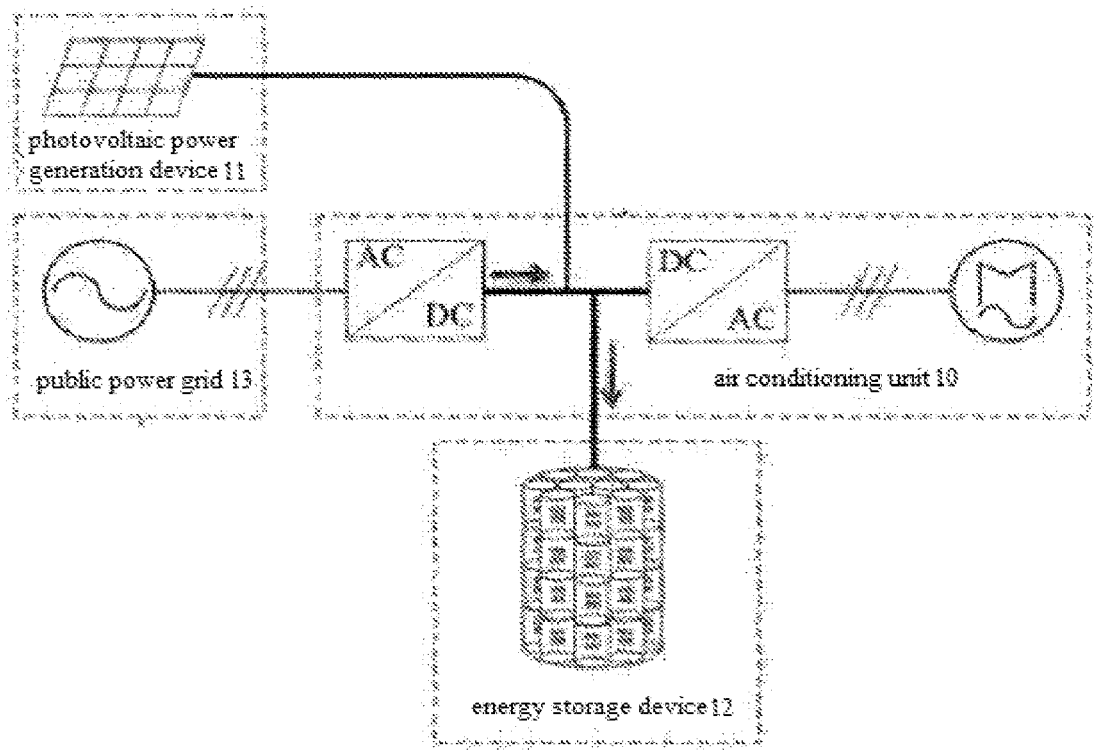
FIG. 7 is a schematic diagram of power supply in which the public power grid charges the energy storage device when the photovoltaic power generation device is not generating power, the air conditioning unit is not operating, and power of the energy storage device is insufficient.

When determining that the photovoltaic power generation device 11 is not generating power, the air conditioning unit 10 is not operating and power of the energy storage device 12 is insufficient, the scheduling module 152 controls the public power grid 13 to charge the energy storage device 12. This is the fifth working mode. As shown in FIG. 7, when the photovoltaic power generation device 11 is not generating power, the air conditioning unit 10 is not operating and power of the energy storage device 12 is insufficient, the energy storage device 12 is charged by the public power grid 13.

Figure 8:
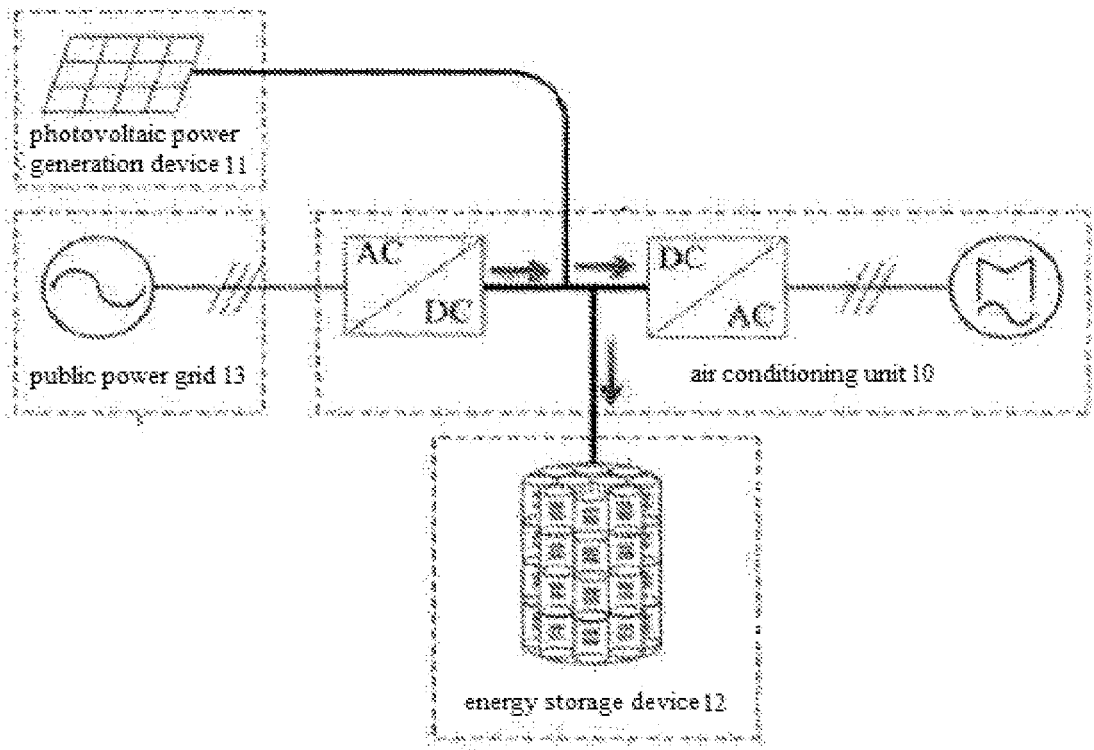
FIG. 8 is a schematic diagram of power supply in which the public power grid supplies power to the air conditioning unit so as to drive the air conditioner to operate, and charges the energy storage device when the photovoltaic power generation device is not generating power, and power of the energy storage device is insufficient.

When determining that the photovoltaic power generation device 11 is not generating power and power of the energy storage device 12 is insufficient, the scheduling module 152 controls the public power grid 13 to drive the air conditioning unit 10 to operate, and controls the public power grid 10 to charge the energy storage device 12. This is the sixth working mode. As shown in FIG. 8, when the photovoltaic power generation device 11 is not generating power and power of the energy storage device 12 is insufficient, the air conditioning unit 10 is driven to operate by the public power grid 13 while charging the energy storage device 12 by the public power grid 13.

Figure 9:
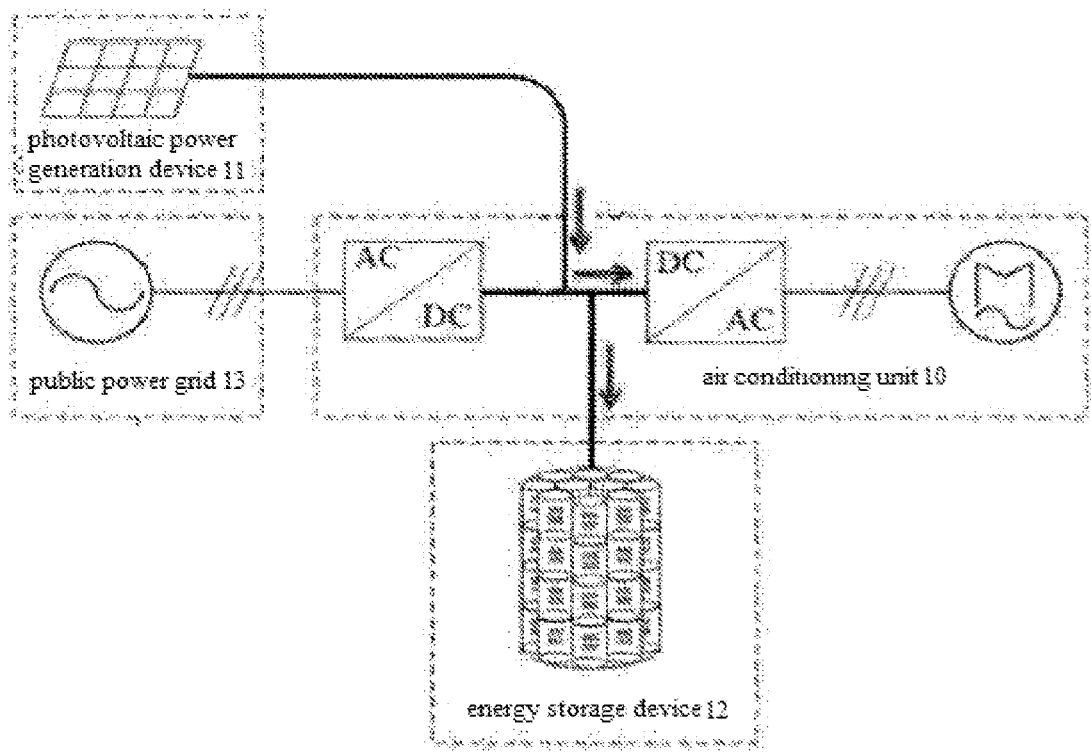
FIG. 9 is a schematic diagram of power supply in which power generated by the photovoltaic power generation device is preferentially used to charge the energy storage device when power generated by the photovoltaic power generation device is surplus after being supplied for the operation of the air conditioning unit, and power of the energy storage device is insufficient.

When determining that power generated by the photovoltaic power generation device 11 is more than power required for the operation of the air conditioning unit 10, and power of the energy storage device 12 is insufficient, the scheduling module 152 controls the photovoltaic power generation device 11 to supply power to the air conditioning unit 10, and controls the photovoltaic power generation device 11 to charge the energy storage device. This is the seventh working mode. As shown in FIG. 9, when power generated by the photovoltaic power generation device 11 is surplus after being supplied for the operation of the air conditioning unit 10, and power of the energy storage device 12 is insufficient, the photovoltaic power is preferentially used to charge the energy storage device 12.

Figure 10:
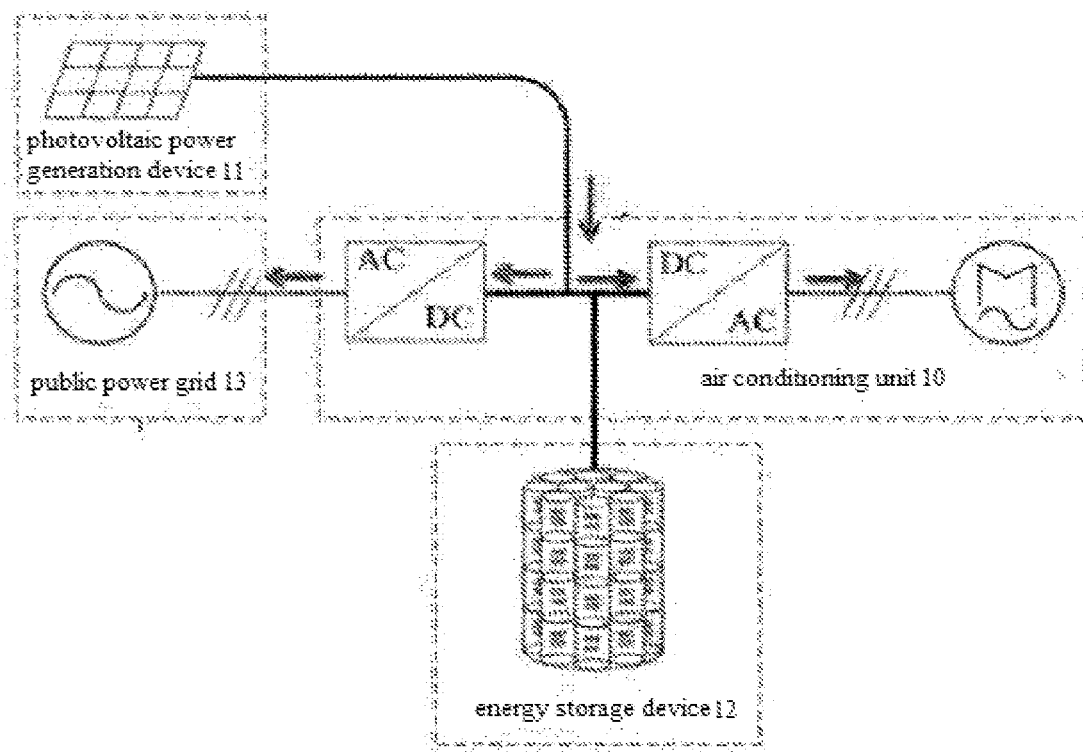
FIG. 10 is a schematic diagram of power supply in which when power generated by the photovoltaic power generation device is surplus after being supplied for the operation of the air conditioning unit, and the energy storage device has sufficient power or is not working, the surplus power is supplied to the public power grid.

When determining that power generated by the photovoltaic power generation device 11 is more than power required for the operation of the air conditioning unit 10, and the energy storage device 12 has sufficient power or is not working, the scheduling module 152 controls the photovoltaic power generation device 11 to supply power to the air conditioning unit 10, and controls the photovoltaic power generation device 11 to comply the grid-connected power supply to the public power grid 13. This is the eighth working mode. As shown in FIG. 10, when power generated by the photovoltaic power generation device 11 is surplus after being supplied for the operation of the air conditioning unit 10, and the energy storage device 12 has sufficient power or is not working, the surplus power is supplied to the public power grid.

Figure 11:
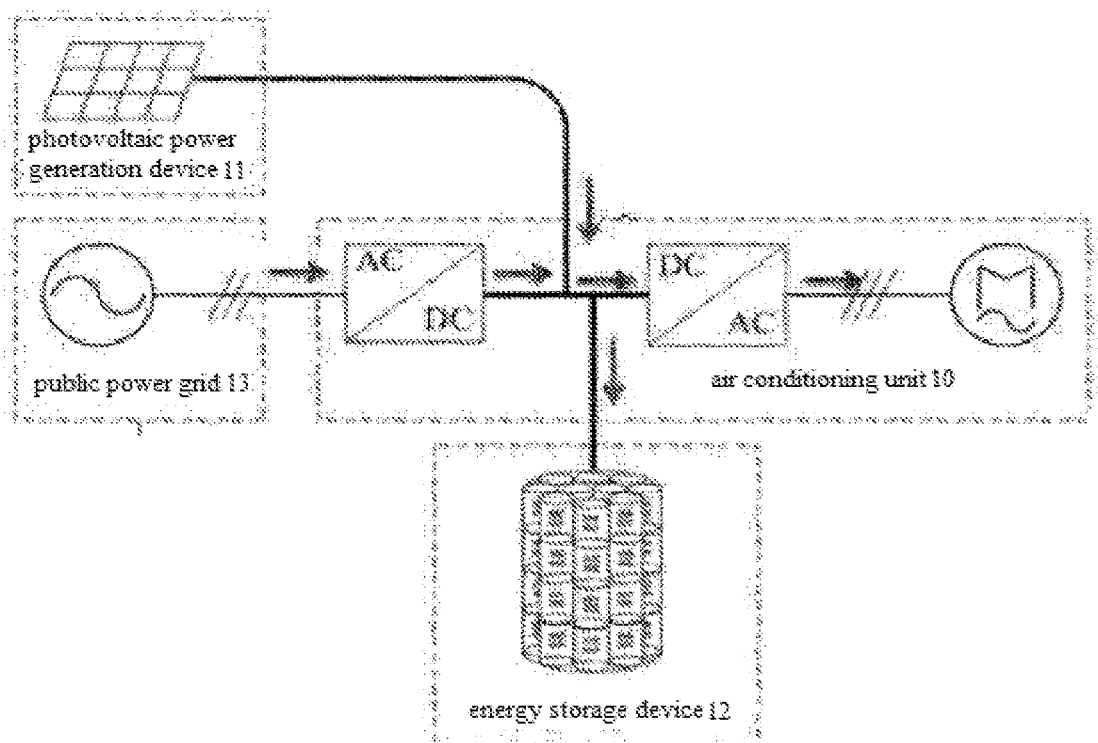
FIG. 11 is a schematic diagram of power supply in which when power generated by the photovoltaic power generation device is insufficient for the operation of the air conditioning unit and power of the energy storage device is also insufficient, the insufficient power is supplied by the public power grid, and the public power grid also supplies power to the energy storage device.
Figure 12:
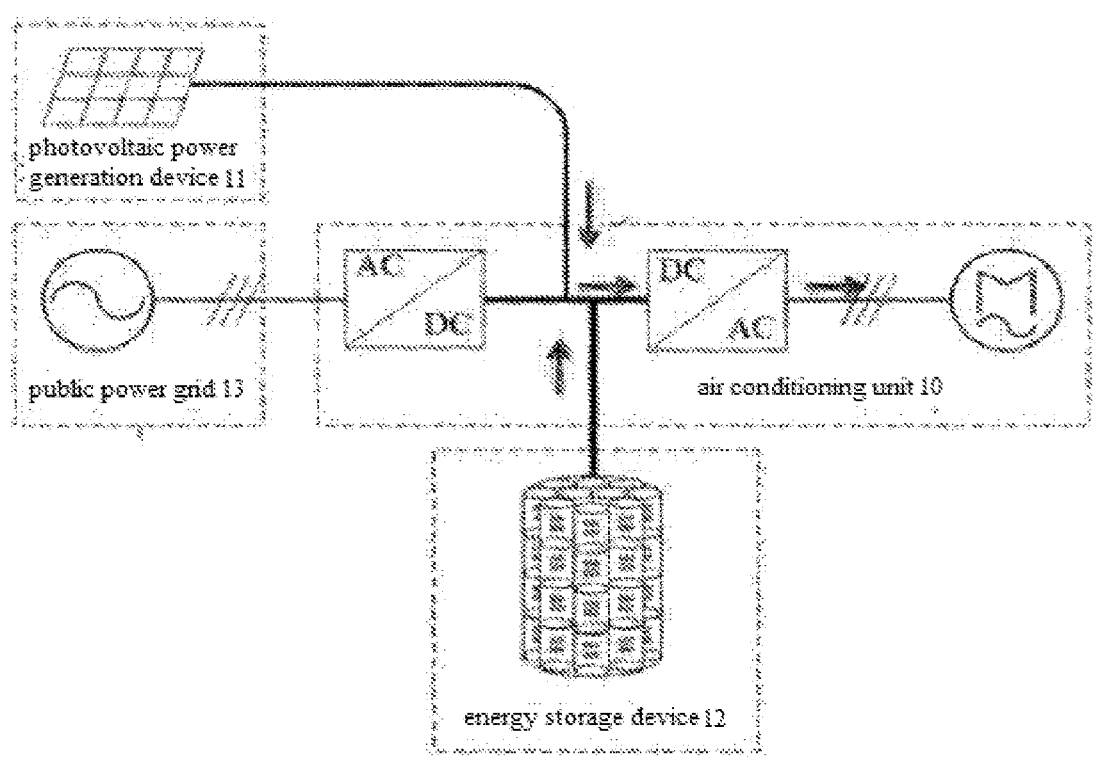
FIG. 12 is a schematic diagram of power supply in which when power generated by the photovoltaic power generation device is insufficient for the operation of the air conditioning unit and the power of the energy storage device is sufficient, the insufficient power is supplied by the energy storage device.

When determining that power generated by the photovoltaic power generation device 11 is less than power required for the operation of the air conditioning unit 10, and power of the energy storage device 12 is insufficient, the scheduling module 152 controls the photovoltaic power generation device 11 and the public power grid 13 to supply power to the air conditioning unit 10 jointly, and controls the public power grid 13 to charge the energy storage device 12. This is the ninth working mode. As shown in FIG. 11, when power generated by the photovoltaic power generation device 11 is insufficient for the operation of the air conditioning unit 10, and power of the energy storage device 12 is also insufficient, the insufficient power is supplied by the public power grid 13, and the public power grid 13 also supplies power to the energy storage device 12. When determining that power generated by the photovoltaic power generation device 11 is less than power required for the operation of the air conditioning unit 10, and power of the energy storage device 12 is sufficient, the scheduling module 152 controls the photovoltaic power generation device 11 and the energy storage device 12 to supply power to the air conditioning unit jointly. This is the tenth working mode. As shown in FIG. 12, when power generated by the photovoltaic power generation device 11 is insufficient for the operation of the air conditioning unit 10, and power of the energy storage device 12 is sufficient, the insufficient power is supplied by the energy storage device 12.

Figure 13:
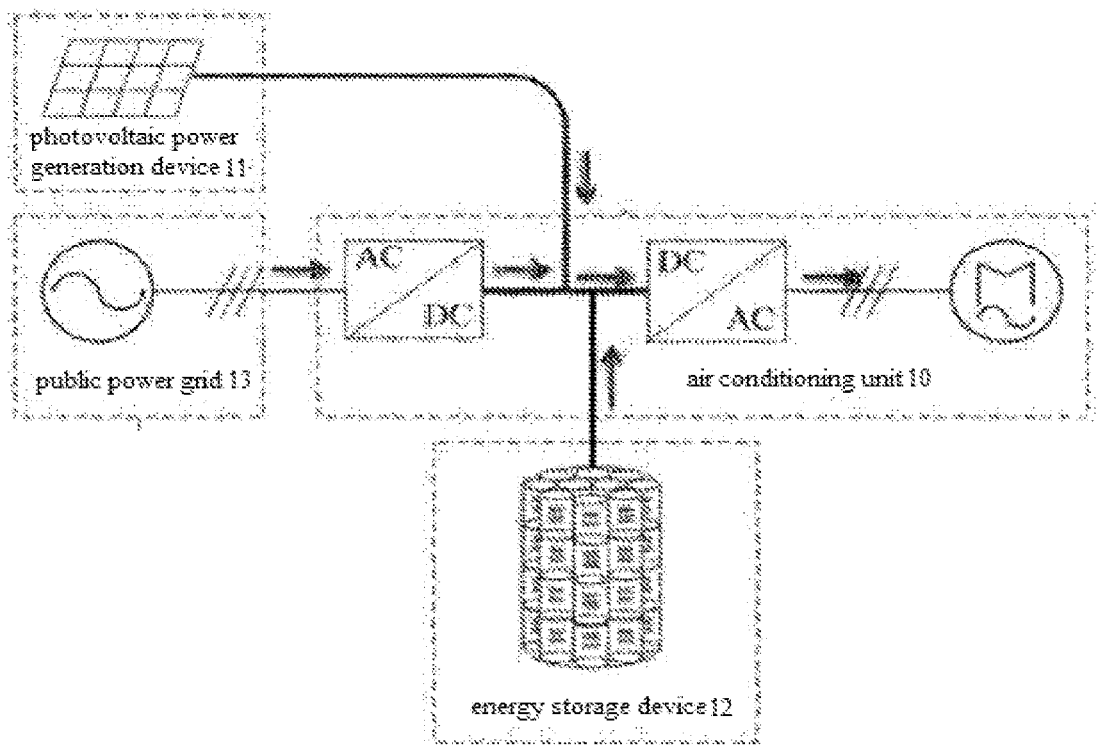
FIG. 13 is a schematic diagram of power supply in which when the energy storage device is not working, and power generated by the photovoltaic power generation device is insufficient for the operation of the air conditioning unit, the insufficient power is supplied by the public power grid.
Figure 14:
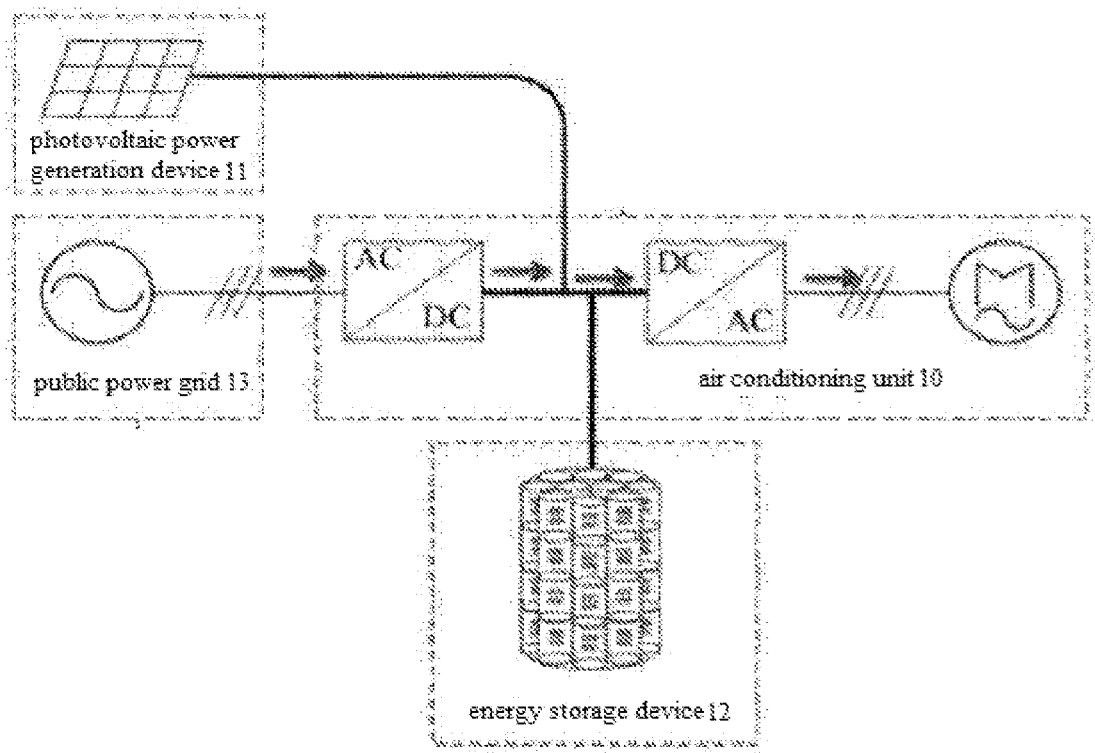
FIG. 14 is a schematic diagram of power supply in which the public power grid directly supplies power to the air conditioning unit when the energy storage device is not working, and the photovoltaic power generation device is not generating power.

When determining that power generated by the photovoltaic power generation device 11 is less than power required for the operation of the air conditioning unit 10, and the energy storage device 12 is not working, the scheduling module 152 controls the photovoltaic power generation device 11 and the public power grid 13 to supply power to the air conditioning unit 10 jointly. This is the eleventh working mode. As shown in FIG. 13, when the energy storage device 12 is not working, and power generated by the photovoltaic power generation device 11 is insufficient for the operation of the air conditioning unit 10, the insufficient power is supplied by the public power grid 13.

When determining that the photovoltaic power generation device 11 is not generating power, and the energy storage device 12 is not working, the scheduling module 152 controls the public power grid 13 to supply power to the air conditioning unit 10. This is the twelfth working mode. When the energy storage device 12 is not working, and the photovoltaic power generation device 11 is not generating power, the public power grid 13 directly supplies power to multi-split air conditioners. When the photovoltaic energy storage air conditioner of the present disclosure operates in the first mode which is a pure photovoltaic air conditioner mode, self generation and self usage are achieved, and the supply is equal to the demand. When operating in the second mode, the air conditioner itself stores power to reduce the loss produced by connection of the inverter to the grid, and stores power as standby energy of the system to improve the reliability. When the air conditioner operates in the third mode, the air conditioner itself cannot incorporate more energy and the energy is excessive, the photovoltaic power generation device is connected to the grid to achieve no waste of the generated power and maximize photoelectric utilization. When operating in the fourth mode, the air conditioning unit directly uses the energy stored by the system and does not need to get power from the grid, and the air conditioner has certain self-supply ability. When operating in the fifth mode, the public power grid charges batteries to ensure that the standby energy of the air conditioner is sufficient at all times, thereby promoting the ability to response to emergencies.

When the photovoltaic energy storage air conditioner of the present disclosure operates in the sixth mode, the photovoltaic array cannot meet the load demand, and the air conditioner can operates normally without being affected. When operating in the seventh mode, in addition to meeting power demand of the photovoltaic energy storage air conditioner, the excess power is directly stored as standby energy, thereby avoiding power conversion loss caused by grid connection. When operating in the eighth mode, the air conditioner can output power while meeting power demand of the photovoltaic energy storage air conditioner, thereby improving the benefit of the system. When operating in the ninth mode, it is also possible to supplement the energy storage device for the air conditioning unit, while maintaining the operation of the air conditioning unit. When operating in the tenth mode, power generated by the photovoltaic power generation device is insufficient, but the air conditioner can also achieve self-sufficiency. When operating in the eleventh mode, a small amount of power generated by the photovoltaic power generation device can also be fully utilized, and the air conditioner is also ensured to operate normally. When operating in the twelfth mode, the photovoltaic power generation device and the energy storage module, which are not working, do not affect the use of the air conditioner.

Figure 15:
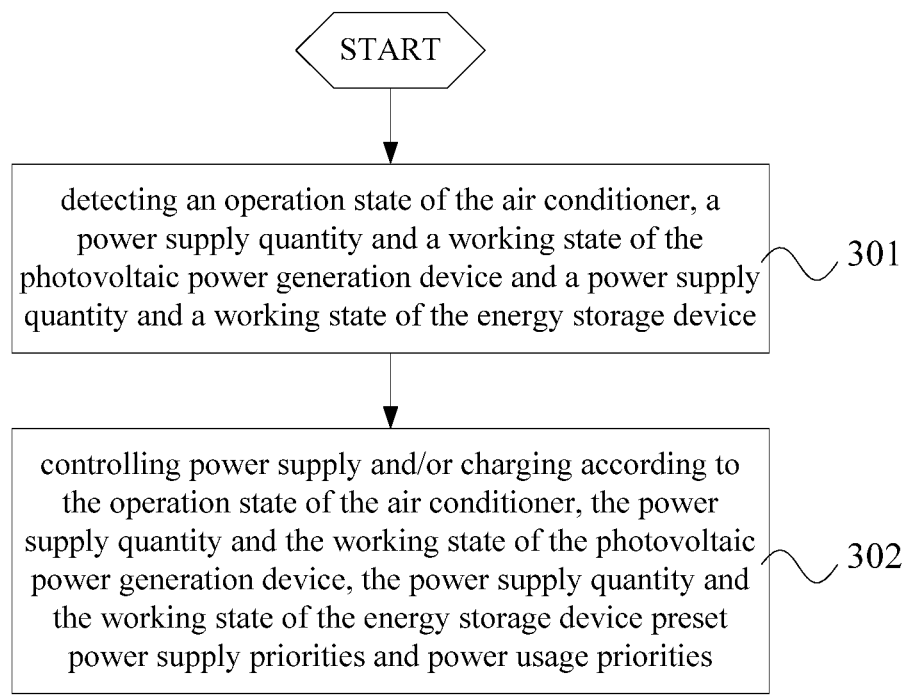
FIG. 15 is a flow diagram according to some embodiments of a control method for a photovoltaic energy storage air conditioner of the present disclosure.

The photovoltaic energy storage air conditioner of the present disclosure can operate in the above 12 modes. Multiple power supplies work alternately or simultaneously to realize optimal use of power under different power generation and usage conditions, thereby ensuring maximum utilization of clean photovoltaic energy, and also ensuring normal operation of the air conditioner. The 12 working modes can be switched in real time, ensuring the most efficient usage of energy and the stable and reliable operation of the photovoltaic energy storage air conditioning system. FIG. 15 is a flow diagram according to some embodiments of a control method for a photovoltaic energy storage air conditioner of the present disclosure, as shown in FIG. 15:

step 301, detecting an operation state of the air conditioner, a power supply quantity and a working state of the photovoltaic power generation device and a power supply quantity and a working state of the energy storage device; and step 302: controlling power supply and/or charging according to the operation state of the air conditioner, the power supply quantity and the working state of the photovoltaic power generation device, the power supply quantity and the working state of the energy storage device, preset power supply priorities and power usage priorities.

Power supplies selected according to the highest to lowest order of the power supply priorities are successively the photovoltaic power generation device, the energy storage device and the public power grid; wherein the devices to be supplied power according to the highest to lowest order of the power supply priorities are successively the air conditioning unit, the energy storage device and the public power grid.

In some embodiments, when it is determined that power generated by the photovoltaic power generation device is the same as power required for the operation of the air conditioning unit, the photovoltaic power generation device is selected as a power supply for supplying power to the air conditioning unit only; when it is determined that the air conditioning unit is not operating and power of the energy storage device is insufficient, the photovoltaic power generation device is selected to charge the energy storage device; and when it is determined that the air conditioning unit is not operating and the energy storage device has sufficient power or is not working, the photovoltaic power generation device is selected to comply the grid-connected power supply to the public power grid.

When it is determined that the photovoltaic power generation device is not generating power and power of the energy storage device is sufficient, the energy storage device is controlled to drive the air conditioning unit to operate; when it is determined that the photovoltaic power generation device is not generating power, the air conditioning unit is not operating and power of the energy storage device is insufficient, the public power grid is controlled to charge the energy storage device; and when it is determined that the photovoltaic power generation device is not generating power and power of the energy storage device is insufficient, the public power grid is controlled to drive the air conditioning unit to operate, and the public power grid is controlled to charge the energy storage device.

When it is determined that power generated by the photovoltaic power generation device is more than power required for the operation of the air conditioning unit and power of the energy storage device is insufficient, the photovoltaic power generation device is controlled to supply power to the air conditioning unit, and the photovoltaic power generation device is controlled to charge the energy storage device; when it is determined that power generated by the photovoltaic power generation device is more than power required for the operation of the air conditioning unit and the energy storage device has sufficient power or is not working, the photovoltaic power generation device is controlled to supply power to the air conditioning unit, and the photovoltaic power generation device is controlled to comply the grid-connected power supply to the public power grid; and when it is determined that power generated by the photovoltaic power generation device is less than power required for the operation of the air conditioning unit and power of the energy storage device is insufficient, the photovoltaic power generation device and the public power grid are controlled to supply power to the air conditioning unit jointly, and the public power grid is controlled to charge the energy storage device.

When it is determined that power generated by the photovoltaic power generation device is less than power required for the operation of the air conditioning unit and power of the energy storage device is sufficient, the photovoltaic power generation device and the energy storage device are controlled to supply power to the air conditioning unit jointly; when it is determined that power generated by the photovoltaic power generation device is less than power required for the operation of the air conditioning unit and the energy storage device is not working, the photovoltaic power generation device and the public power grid are controlled to supply power to the air conditioning unit jointly; and when it is determined that the photovoltaic power generation device is not generating power and the energy storage device is not working, the public power grid is controlled to supply power to the air conditioning unit.

The photovoltaic energy storage air conditioner and the control method provided in the above embodiments operate in different working modes according to changes in actual power generation, power storage, and power usage, thereby implementing real-time operation in multiple working modes, reducing the impact of weather changes, the power storage quantity of the storage battery, and the operation state of the power grid on normal operations, and improving the stability and reliability. Moreover, no generated photovoltaic power is wasted, and the charging/discharging has less impact on the service life of the storage battery, such that the maximum benefit can be achieved.

The method and the system of the present disclosure may be implemented in many ways. For example, the method and the system of the present disclosure may be implemented through software, hardware or firmware, or any combination of the software, the hardware and the firmware. The above sequence of the steps of the method is only for description, and the steps of the method according to the present disclosure are not limited to the sequence specifically described above, unless otherwise specified. Besides, in some embodiments, the present disclosure may also be implemented as programs recorded in a medium, and these programs include machine readable instructions for implementing the method according to the present disclosure. Therefore, the present disclosure also covers a recording medium storing programs for executing the method according to the present disclosure.

The description of the present disclosure has been presented for the purposes of illustration and description, and is not exhaustive, or limits the present disclosure to the forms disclosed. Many modifications and variations would be apparent to those of ordinary skill in the art. The embodiments are chosen and described in order to illustrate the principle and practical application of the present disclosure better, and enable those of ordinary skill in the art to understand the present disclosure so as to design various embodiments with various modifications suitable for specific purposes.

The invention claimed is:

1. A photovoltaic energy storage air conditioner, comprising a photovoltaic power generation device, an energy storage device, an air conditioning unit and an energy scheduling and management device;
    wherein the photovoltaic power generation device, the energy storage device and a public power grid are connected to the air conditioning unit for power supply; the photovoltaic power generation device and the public power grid are connected to the energy storage device for charging; the photovoltaic power generation device is configured to comply a grid-connected power supply to the public power grid; and
    wherein the energy scheduling and management device comprises:
        a detection module, configured to detect an operation state of the air conditioner, a power supply quantity and a working state of the photovoltaic power generation device and a power supply quantity and a working state of the energy storage device;
        a scheduling module, configured to control power supply and/or charging according to the operation state of the air conditioner, the power supply quantity and the working state of the photovoltaic power generation device, the power supply quantity and the working state of the energy storage device, preset power supply priorities and power usage priorities; and
    wherein:
    (i) the scheduling module is adapted to control the photovoltaic power generation device only to be a power supply for supplying power to the air conditioning unit, when determining that power generated by the photovoltaic power generation device is the same as power required for operation of the air conditioning unit;
    the scheduling module is adapted to control the photovoltaic power generation device to charge the energy storage device, when determining that the air conditioning unit is not operating and power of the energy storage device is insufficient to operate the air conditioner; and
    the scheduling module is adapted to control the photovoltaic power generation device to comply the grid-connected power supply to the public power grid, when determining that the air conditioning unit is not operating and the energy storage device has sufficient power to operate the air conditioner or is not working; or
    (ii) the scheduling module is adapted to control the energy storage device to drive the air conditioning unit to operate when determining that the photovoltaic power generation device is not generating power and power of the energy storage device is sufficient to operate the air conditioner;
    the scheduling module is adapted to control the public power grid to charge the energy storage device when determining that the photovoltaic power generation device is not generating power and the air conditioning unit is not operating and power of the energy storage device is insufficient to operate the air conditioner;
    the scheduling module is adapted to control the public power grid to drive the air conditioning unit to operate and control the public power grid to charge the energy storage device when determining that the photovoltaic power generation device is not generating power and power of the energy storage device is insufficient to operate the air conditioner; and
    the scheduling module is adapted to control the photovoltaic power generation device to supply power to the air conditioning unit and control the photovoltaic power generation device to charge the energy storage device, when determining that power generated by the photovoltaic power generation device is more than power required for the operation of the air conditioning unit, and power of the energy storage device is insufficient to operate the air conditioner; or
    (iii) the scheduling module is adapted to control the photovoltaic power generation device to supply power to the air conditioning unit and control the photovoltaic power generation device to comply the grid-connected power supply to the public power grid, when determining that power generated by the photovoltaic power generation device is more than power required for the operation of the air conditioning unit, and the energy storage device has sufficient power to operate the air conditioner or is not working;
    the scheduling module is adapted to control the photovoltaic power generation device and the public power grid to supply power to the air conditioning unit jointly and control the public power grid to charge the energy storage device, when determining that power generated by the photovoltaic power generation device is less than power required for the operation of the air conditioning unit, and power of the energy storage device is insufficient to operate the air conditioner; and the scheduling module is adapted to control the photovoltaic power generation device and the energy storage device to supply power to the air conditioning unit jointly, when determining that power generated by the photovoltaic power generation device is less than power required for the operation of the air conditioning unit and power of the energy storage device is sufficient to operate the air conditioner.

2. The photovoltaic energy storage air conditioner according to claim 1, wherein:

the photovoltaic power generation device comprises a photovoltaic array, an inverter, a switching means, and an electric energy meter;

the photovoltaic array, the switching means and the inverter are successively connected; the inverter is connected to the public power grid; the switching means is connected to the air conditioning unit; the electric energy meter is arranged on a line between the photovoltaic array and the switching means; and the detection module is connected to the electric energy meter to obtain an electric quantity generated by the photovoltaic array; and the scheduling module is connected to the switching means and the inverter so as to control the photovoltaic array to supply power to the air conditioning unit and/or the public power grid.

3. The photovoltaic energy storage air conditioner according to claim 1, wherein:

the energy storage device comprises an energy storage battery pack and a battery energy management module; and the battery energy management module is connected to the energy storage battery pack; the detection module and the scheduling module are connected to the battery energy management module, the detection module obtains an electric quantity of the energy storage battery pack through the battery energy management module, and the scheduling module controls a working state of the energy storage battery pack through the battery energy management module.

4. The photovoltaic energy storage air conditioner according to claim 3, wherein the energy storage device further comprises a direct current converter; and the energy storage battery pack is connected to the public power grid through the direct current converter.

5. The photovoltaic energy storage air conditioner according to claim 1, wherein the air conditioning unit is adapted to connect to the public power grid through a switching device; and the scheduling module is connected to the switching device.

6. The photovoltaic energy storage air conditioner according to claim 1, wherein the air conditioning unit comprises a controller, and the controller is connected to the detection module to obtain the operation state of the air conditioner.

7. The photovoltaic energy storage air conditioner according to claim 1, wherein:

the power supplies selected by the scheduling module according to the highest to lowest order of the power supply priorities are successively the photovoltaic power generation device, the energy storage device and the public power grid; and wherein the devices to be supplied power according to the highest to lowest order of the power supply priorities are successively the air conditioning unit, the energy storage device and the public power grid.

8. The photovoltaic energy storage air conditioner according to claim 7, wherein:

the scheduling module is adapted to control the photovoltaic power generation device and the public power grid to supply power to the air conditioning unit jointly, when determining that power generated by the photovoltaic power generation device is less than power required for the operation of the air conditioning unit and the energy storage device is not working; and the scheduling module is adapted to control the public power grid to supply power to the air conditioning unit, when determining that the photovoltaic power generation device is not generating power and the energy storage device is not working.

9. A control method for a photovoltaic energy storage air conditioner, comprising:

detecting an operation state of the air conditioner, a power supply quantity and a working state of the photovoltaic power generation device and a power supply quantity and a working state of the energy storage device; and controlling power supply and/or charging according to the operation state of the air conditioner, the power supply quantity and the working state of the photovoltaic power generation device, the power supply quantity and the working state of the energy storage device, preset power supply priorities and power usage priorities;

wherein the photovoltaic power generation device, the energy storage device and a public power grid are connected to the air conditioning unit for power supply; the photovoltaic power generation device and the public power grid are connected to the energy storage device for charging; and the photovoltaic power generation device is further configured to comply a grid-connected power supply to the public power grid; and wherein controlling power supply and/or charging according to the operation state of the air conditioner, the power supply quantity and the working state of the photovoltaic power generation device, the power supply quantity and the working state of the energy storage device, preset power supply priorities and power usage priorities comprises:

(i) when determining that power generated by the photovoltaic power generation device is the same as power required for the operation of the air conditioning unit, selecting the photovoltaic power generation device only as a power supply for supplying power to the air conditioning unit;

when determining that the air conditioning unit is not operating and power of the energy storage device is insufficient to operate the air conditioner, selecting the photovoltaic power generation device to charge the energy storage device; and when determining that the air conditioning unit is not operating and the energy storage device has sufficient power to operate the air conditioner or is not working, selecting the photovoltaic power generation device to comply the grid-connected power supply to the public power grid; or (ii) when determining that the photovoltaic power generation device is not generating power and power of the energy storage device is sufficient to operate the air conditioner, driving, by the energy storage device, the air conditioning unit to operate;

when determining that the photovoltaic power generation device is not generating power, the air conditioning unit is not operating and power of the energy storage device is insufficient to operate the air conditioner, charging, by the public power grid, the energy storage device; and when determining that the photovoltaic power generation device is not generating power and power of the energy storage device is insufficient to operate the air conditioner, driving, by the public power grid the air conditioning unit to operate, and charging, by the public power grid, the energy storage device; or (iii) when determining that power generated by the photovoltaic power generation device is more than power required for the operation of the air conditioning unit and power of the energy storage device is insufficient to operate the air conditioner, supplying, by the photovoltaic power generation device, power to the air conditioning unit, and charging, by the photovoltaic power generation device, the energy storage device;

when determining that power generated by the photovoltaic power generation device is more than power required for the operation of the air conditioning unit and the energy storage device has sufficient power to operate the air conditioner or is not working, supplying, by the photovoltaic power generation device, power to the air conditioning unit, and complying, by the photovoltaic power generation device, the grid-connected power supply to the public power grid; and when determining that power generated by the photovoltaic power generation device is less than power required for the operation of the air conditioning unit and power of the energy storage device is insufficient to operate the air conditioner, supplying, by the photovoltaic power generation device and the public power grid, power to the air conditioning unit jointly, and charging, by the public power grid, the energy storage device.

10. The control method according to claim 9, wherein controlling power supply and/or charging according to the operation state of the air conditioner, the power supply quantity and the working state of the photovoltaic power generation device, the power supply quantity and the working state of the energy storage device, preset power supply priorities and power usage priorities comprises:

successively selecting the photovoltaic power generation device, the energy storage device and the public power grid as the power supplies according to the highest to lowest order of the power supply priorities;

wherein the devices to be supplied power according to the highest to lowest order of the power supply priorities are successively the air conditioning unit, the energy storage device and the public power grid.

11. The control method according to claim 10, wherein controlling power supply and/or charging according to the operation state of the air conditioner, the power supply quantity and the working state of the photovoltaic power generation device, the power supply quantity and the working state of the energy storage device, specified power supply priorities and power usage priorities comprises:

when determining that power generated by the photovoltaic power generation device is less than power required for the operation of the air conditioning unit and power of the energy storage device is sufficient to operate the air conditioner, supplying, by the photovoltaic power generation device and the energy storage device, power to the air conditioning unit jointly;

when determining that power generated by the photovoltaic power generation device is less than power required for the operation of the air conditioning unit and the energy storage device is not working, supplying, by the photovoltaic power generation device and the public power grid, power to the air conditioning unit jointly; and when determining that the photovoltaic power generation device is not generating power and the energy storage device is not working, supplying, by the public power grid, power to the air conditioning unit.

\* \* \* \* \*